US 6,530,274 B1

(12) United States Patent
Philbeck

(10) Patent No.: US 6,530,274 B1
(45) Date of Patent: Mar. 11, 2003

(54) APPARATUS FOR LIQUID LEVEL MEASUREMENT IN A CONTAINER

(76) Inventor: Bill Philbeck, 129 Hardin Ct., Terrytown, LA (US) 70056

( * ) Notice: Subject to any disclaimer, the term of this patent is extended or adjusted under 35 U.S.C. 154(b) by 0 days.

(21) Appl. No.: 09/973,525

(22) Filed: Oct. 9, 2001

(51) Int. Cl.[7] .............................................. G01F 23/30
(52) U.S. Cl. ........................ 73/314; 73/322; 73/322.5; 340/623
(58) Field of Search ....................... 73/314, 322, 322.5; 340/623

(56) References Cited

U.S. PATENT DOCUMENTS 1,827,192 A  * 10/1931  Cuno et al. ................... 73/314
2,807,960 A  * 10/1957  Schweitzer .................. 73/322
3,359,799 A  * 12/1967  Lubin ....................... 200/84 R
4,526,033 A  * 7/1985   Flider ....................... 116/228

* cited by examiner

Primary Examiner—Hezron Williams
Assistant Examiner—André K. Jackson
(74) Attorney, Agent, or Firm—Keaty Professional Law Corporation

(57) ABSTRACT

A liquid level measuring device for measuring the level of liquid in a storage or dispensing tank has an elongated tubular hollow body that carries a threaded coupler adapted for engaging a threaded nipple on top of the tank. A buoyant float is attached to a lower portion of the elongated body. The body slides in relation to the coupler while the coupler remains stationary in relation to the tank. As the liquid is dispensed from the tank, the buoyant float that was positioned on the surface of the liquid in the tank, lowers in relation to the tank, moving the elongated body into the tank. Measuring indicia placed on the exterior surface of the elongated body allows visual observation of the changing level of liquid in the tank.

4 Claims, 2 Drawing Sheets

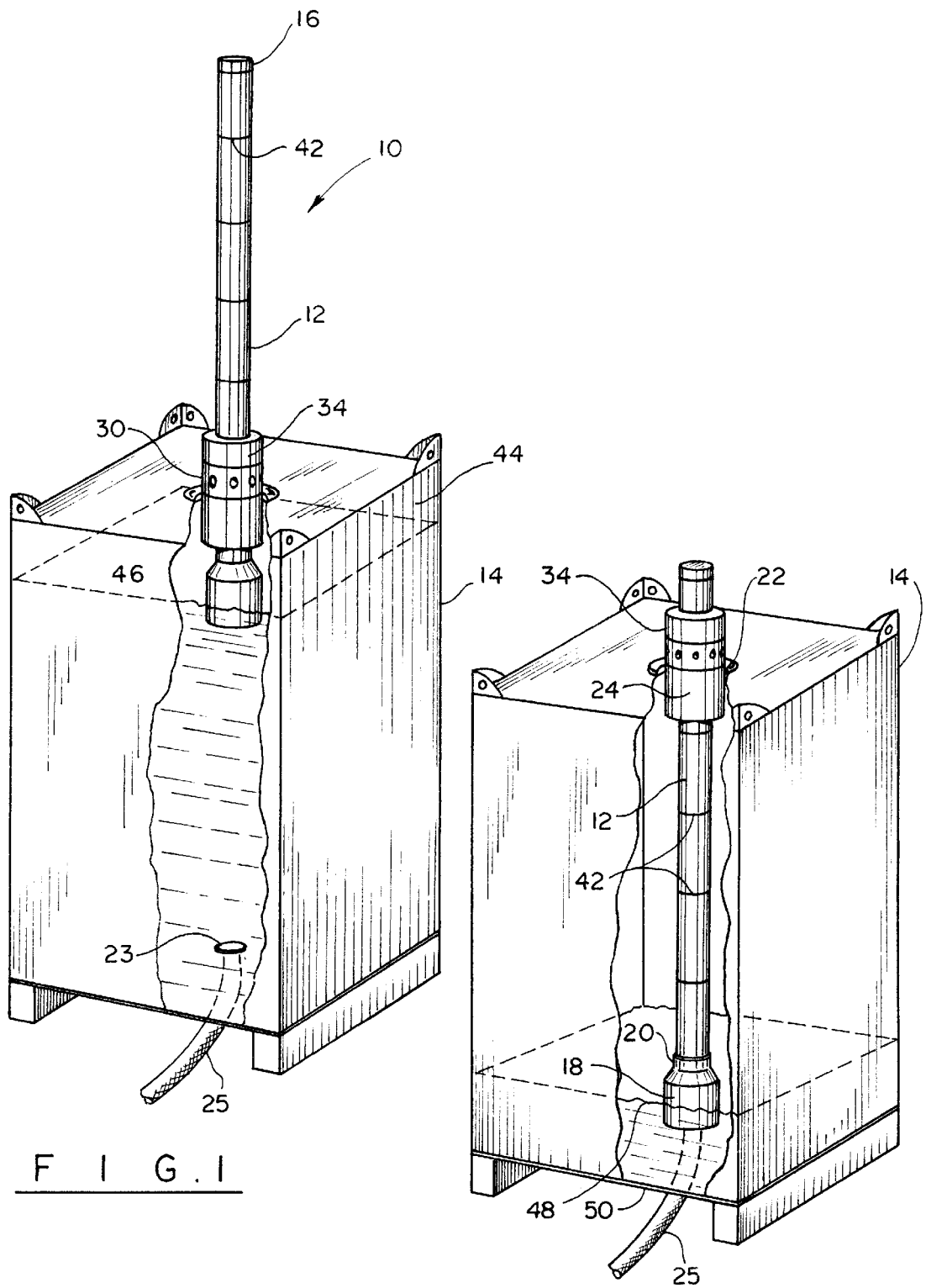

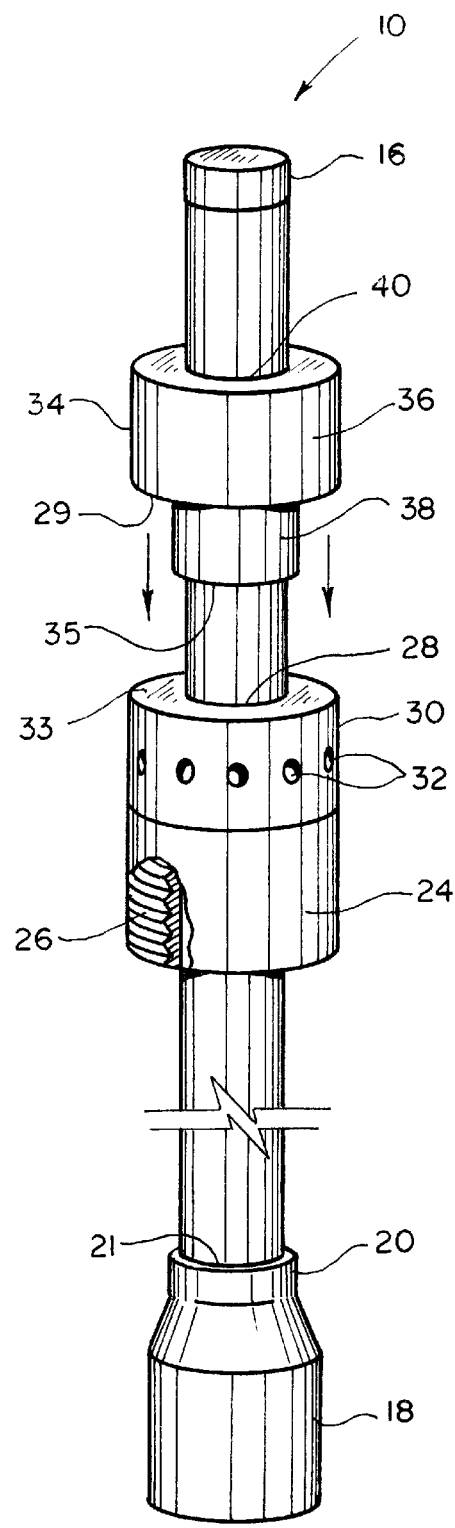
F I G. 3

APPARATUS FOR LIQUID LEVEL MEASUREMENT IN A CONTAINER

BACKGROUND OF THE INVENTION

The present invention relates to a level measuring device, and more particularly a device for measuring liquid levels in tanks, such as storage tanks, liquid dispensing tanks and the like.

Many industries require storage of liquids and viscous liquids in tanks during processing and dispensing. The oilfield industry uses drilling mud for a variety of onshore and offshore operations. The drill muds are usually stored in special tanks having a top opening for input of the drill mud and an outlet in the bottom of the tank for dispensing of the mud as needed.

The viscosity of the drill mud and the chemical composition thereof play an important role in the success of the drilling and circulation operations. Some of the factors that need to be continuously monitored during dispensing is the viscosity of the mud, which may be lighter or heavier, depending on the strata, rock formations, and other conditions in a well bore. Some of the additives are relatively expensive and are added in small amounts. Other additives, such as synthetic oils may be added in larger amounts to facilitate drilling operations.

Mud engineers and workers carefully monitor the content of the circulation mud and the level of it in a mud tank. The mud tanks are usually made of steel. Sometimes expensive level measuring devices are used. More often, a mud engineer climbs to the top of the tank and peers into the dark interior of the dispensing tank to roughly estimate whether the mud is of the right viscosity and whether any additions are required.

Another method of making a rough estimate is to tap the side of the tank and try to guess by the reverberating sound how much mud is left in the mud tank. The mud engineers often times have to guess how much mud is left in the stainless steel tank because there is no measuring indicia and no windows through which one can see the level of liquid in the tank.

Sometimes the mud engineer has to supervise a number of such tanks and, in inclement weather, climbing up and down to reach the deck where the tanks are positioned becomes a serious task, especially due to the voluminous size of the tanks and difficulty of visual inspection.

The present invention contemplates elimination of drawbacks associated with the current methods of determining the level in the mud tank and provision of an inexpensive, easy-to use device for measuring the level of contents in a tank.

SUMMARY OF THE INVENTION

It is, therefore, an object of the present invention to provide a device for measuring a level of liquid in a storage or dispensing tank.

It is another object of the present invention to provide a level-measuring device that would allow an operator to determine the level of liquid left in the tank by visual observation from the exterior of the tank.

It is a further object of the present invention to provide a level-measuring device that is particularly adapted for use with mud tanks.

These and other objects of the present invention are achieved through a provision of an apparatus for measuring the level of liquid, which comprises an elongated hollow body having a floating member secured on its lower end. The elongated body carries a coupler, within which the body freely slides. A lower part of the coupler has inner threads that are adapted to engage with the threads of a nipple secured on the top of the tank. The nipple has exterior threads; it is usually covered with a lid, or cap when the liquid is stored or dispensed. The outlet port of the tank is on the bottom of the tank.

An upper portion of the body is provided with a top cap. An upper part of the coupler contacts a sliding stop that prevents the coupler from disengaging from the body. The stop has an inner opening with a diameter smaller than the size of the top cap.

The level measuring device is lowered into the tank with liquid such that the float member floats on top of the liquid. The coupler is threadably engaged with the threads of the nipple after the lid has been removed from the tank. The body, which has a length approximating the depth of the tank, gradually lowers into the tank by sliding through the stationary coupler. The body descends into the tank as the level of liquid in the tank decreases.

The exterior surface of the body is provided with measuring indicia to allow an operator to visually observe the decreasing level of liquid in the tank from the outside of the tank. If the level decreases too slow an operator may have to adjust the viscosity of the liquid. Conversely, if the tank empties too fast, the operator may need to add solid additives to the mixture in the tank. If the liquid stops flowing, there may be an obstruction in the line that needs to be attended to.

The device of the present invention is easy to operate and inexpensive to manufacture. It does not require any modifications in the existing tank structure, instead capable of accommodating all types of storage and dispensing tanks.

BRIEF DESCRIPTION OF THE DRAWINGS

Reference will now be made to the drawings, wherein like parts are designated by like numerals and wherein, FIG. 1 is a perspective view of the level-measuring device in accordance with the present invention positioned in a tank full of liquid.

FIG. 2 is a perspective view of the level-measuring device of the present invention positioned in a tank when the liquid level has substantially decreased.

FIG. 3 is a perspective, partially cut away, exploded view of the measuring device in accordance with the present invention.

DETAILED DESCRIPTION OF THE PREFERRED EMBODIMENT

Turning now to the drawings in more detail, numeral 10 designates the level measuring device in accordance with the present invention. The device 10 comprises an elongated tubular body 12 that is slightly greater in length than the depth of a storage and dispensing tank 14. The top of the body 12 is provided with a top cap 16 that closes the top opening of the hollow body 12. The bottom of the body 12 carries a flotation member, or float 18, which is securely connected to the body 12. The float 18 has a generally cylindrical main body and a frustoconically-shaped upper collar 20. The collar 20 may engage the lower part of the body 12 by friction or may be threadably engageable with the body 12, if desired.

The storage and dispensing tank 14 may have a square or rectangular configuration, depending on the type used in a particular industry. Conventional storage tanks for mud used in the oilfield are provided with a top opening 22 and a bottom outlet port 23. A dispensing hose 25 is connected to the port 23 for dispensing of liquid from the tank 14.

The top opening 22 is surrounded with an exteriorly threaded nipple (not shown), which is closed with a lid (not shown) when the tank 14 is in transportation or in a conventional dispensing mode. The device 10 of the instant application is designed to be operationally connected to the exteriorly threaded nipple of the tank 14. To this end, the device 10 is provided with a coupler 24 of a generally cylindrical configuration. The lower part of the coupler 24 is provided with interior threads 26. The threads 26 engage with the threads of the nipple of the tank 14 and secure the coupler 24 on top of the tank 14.

A through opening 28 formed in the coupler 24 has a diameter greater than the exterior diameter of the body 12, such that the body 12 freely slides within the opening 28 of the coupler 24. An upper portion 30 of the coupler 24 has a smooth interior wall without threads. The upper portion 30 is provided with a plurality of through openings 32, which serve as vents to allow escape of gases from the tank 14 when the level measuring device 10 is positioned thereon.

A stop member 34 is slidably mounted on the body 12 above the coupler 24. The stop member 34 has a substantially cylindrical upper part 36 and a reduced diameter lower part 38. A central through opening 40 is formed through the body of the stop member 34. The opening 40 has a diameter smaller than the exterior diameter of the cap 16. The exterior diameter of the upper part 36 of the stop member 34 is substantially equal to or greater than the exterior diameter of the portion 30 of the coupler 24. The stop member 34 serves as a means for limiting sliding movement of the body 12 in relation to the stationary positioned coupler 24.

The lower cylindrical part 38 of the stop member 34 fits into the opening 28 of the coupler. An annular shoulder 29 formed between the upper part 36 and the lower part 38 of the stop member 34 contacts the top edge 33 of the coupler 24. A lower edge 35 of the stop member 34 contacts an upper edge 21 of the float 18 when the device 10 is positioned in a tank 14, which is full with mud or other liquid.

The exterior surface of the body 12 is provided with measuring indicia 42 (see FIGS. 1 and 2) that helps the user in determining the level of liquid in the tank 14. The measuring indicia 42 may be calibrated to reflect the liquid level in barrels, liters or gallons, depending on the particular requirements in the industry.

In operation, the user engages the threaded coupler 24 with the exterior threads of the nipple on top of the tank 14. The measuring device 10 is thereby detachably secured on top of the tank 14. The float 18 extends into the interior 44 of the tank 14, wherein liquid, such as mud and the like is deposited up to a desired level 46. As the fluid 46 is being consumed or drained, the body 12, sliding within the stop member 34 and the coupler 24, gradually lowers into the interior 44 of the tank 14.

The mud engineer or other operator can observe the decreasing level of fluid in the tank 14 by observing how much the body 12 is exposed above the tank 14 and above the stop means 34. FIG. 2 illustrates position of the device 10 when the tank is almost empty, with the liquid level 48 being adjacent to the bottom 50 of the tank 14. Therefore, instead of tapping on the side of the tank or peering into the dark enclosure of the tank 14, as was done with conventional methods, the operator can easily determine when the fluid in the tank 14 reaches the level requiring replenishment.

By calibrating the body 12 with desired indicia 42, the operator can determine with a certain degree of precision when the supply in the tank 14 is close to being exhausted.

The device 10 may be made of any non-corrosive material suitable for technological field where the device 10 is to be used. For use with mud fluids, the device 10 may be made of polyvinyl chloride plastic (PVC). The device 10 is lightweight and can easily float on the surface of a viscous or nonviscous fluid. The hollow body 12, as well as the float 18 help the device 10 to stay on top of the liquid level in the tank 14 without submerging.

If desired, the threaded nipple on top of the tank may be fitted with a plastic threaded sleeve with a rifle-type barrel to keep the floating body 12 in a secure position in relation to the nipple and to avoid the metal to plastic connection that may weaken with use.

The vent openings 32 are important because the tank 14 is being drained as the fluid is dispensed through the conduit 25. It is possible to create vacuum in the tank and cause collapse of the tank body unless the vent holes allow circulation of air between the exterior of the tank 14 and the interior thereof.

The top cap 16, which closes the interior of the body 12 prevents rain or ocean water from getting into the interior of the tank 14. The observation of the level of liquid being dispensed from the tank 14 may be done from an enclosed environment, such as a deck structure that protects the mud engineer from elements.

The device 10 also assists the operator in determining whether the consumption of the fluid inside the tank has taken place or not. If suddenly the body 12 stops moving down in relation to the coupler 24, it will serve as a good indication that there is a stoppage somewhere down the line that needs to be attended to Many changes and modifications can be made in the design of the present invention without departing from the spirit thereof. I therefore pray that my rights to the present invention be limited only by the scope of the appended claims.

I claim:

1. An apparatus for determining the amount of liquid in a tank, the tank having a top opening surrounded with an exteriorly threaded nipple, the apparatus comprising:

an elongated hollow body, a top portion of said body carrying a top cap closing an open top end of said hollow body;

a coupler threadably attachable to the threaded nipple, said coupler having an interior opening extending therethrough for slidably receiving the body therein;

a buoyant member fixedly secured on a lower portion of said body, said buoyant member extending into said tank when said coupler is engaged with said nipple, said body moving in relation to said tank in response to displacement of said buoyant member caused by a change in a level of liquid in the tank; and a means for limiting slidable movement of said body in relation to said coupler, said means comprising a cylindrical part slidably positioned between said coupler and said top cap, said cylindrical part having an interior opening with a diameter smaller than the exterior size of said top cap and an exterior diameter substantially equal to or greater than an exterior diameter of said coupler, and wherein said cylindrical part comprises an upper part and a reduced diameter lower part, and wherein a shoulder is formed about the line of connection between the upper part and the lower part, said shoulder resting on a top edge of said coupler when the apparatus is oriented vertically to extend at least in part into said tank.

2. An apparatus for determining the amount of liquid in a tank, the tank having a top opening surrounded with an exteriorly threaded nipple, the apparatus comprising:

an elongated hollow body, a top portion of said body carrying a top cap closing an open top end of said hollow body;

a coupler threadably attachable to the threaded nipple, said coupler having an interior opening extending therethrough for slidably receiving the body therein;

a buoyant member fixedly secured on a lower portion of said body, said buoyant member extending into said tank when said coupler is engaged with said nipple, said body moving in relation to said tank in response to displacement of said buoyant member caused by a change in a level of liquid in the tank; and a means for limiting slidable movement of said body in relation to said coupler, said means comprising a cylindrical part slidably positioned between said coupler and said top cap, said cylindrical part having an interior opening with a diameter smaller than the exterior size of said top cap and an exterior diameter substantially equal to or greater than an exterior diameter of said coupler, and wherein said cylindrical part comprises an upper part and a reduced diameter lower part, and wherein said lower part contacts an upper edge of said buoyant member when the elongated body is positioned in a tank with a high liquid level, said cylindrical part gradually moving away from said buoyant member as the liquid level in the tank decreases.

3. An apparatus for determining the amount of viscous fluid in a dispensing tank, the tank having a top opening surrounded with an exteriorly treaded nipple, the apparatus comprising:

an elongated hollow body, a top portion of said body carring a top cap closing an open lop end of said hollow body;

a coupler threadably attachable to the threaded nipple, said coupler having an interior opening extending therethrough for slidably receiving the body therein, said coupler comprising an internally threaded lower portion and an upper portion unitary connected to the lower portion, said upper portion being provided with a plurality of through openings formed in the annular wall thereof to permit air circulation between the interior of the tank and an exterior thereof;

a buoyant member fixedly secured on a lower portion of said body, said buoyant member extending into said tank when said coupler is engaged with said nipple, said body moving in relation to said tank in response to displacement of said buoyant member caused by a change in a level of viscous fluid in the tank; and a means for limiting slidable movement of said body in relation to said coupler, said means comprising a cylindrical part slidably positioned between said coupler and said top cap, said cylindrical part having an interior opening with a diameter smaller than the exterior size of said top cap and an exterior diameter substantially equal to or greater than an exterior diameter of said coupler, and wherein said cylindrical part comprises an upper part and a reduced diameter lower part, and wherein said lower part contacts an upper edge of said buoyant member when the elongated body is positioned in a tank with a high level of viscous fluid, said cylindrical part gradually moving away from said buoyant member as the level of the viscous fluid in the tank decreases.

4. An apparatus for determining the amount of viscous fluid in a dispensing tank, the tank having a top opening surrounded with an exteriorly treaded nipple, the apparatus comprising:

an elongated hollow body, a top portion of said body carring a top cap closing an open top end of said hollow body;

a coupler threadably attachable to the threaded nipple, said coupler having an interior opening extending therethrough for slidably receiving the body therein, said coupler comprising an internally threaded lower portion and an upper portion unitary connected to the lower portion, said upper portion being provided with a plurality of through openings formed in the annular wall thereof to permit air circulation between the interior of the tank and an exterior thereof;

a buoyant member fixedly secured on a lower portion of said body, said buoyant member extending into said tank when said coupler is engaged with said nipple, said body moving in relation to said tank in response to displacement of said buoyant member caused by a change in a level of viscous fluid in the tank; and a means for limiting slidable movement of said body in relation to said coupler, said means comprising a cylindrical part slidably positioned between said coupler and said top cap, said cylindrical part having an interior opening with a diameter smaller than the exterior size of said top cap and an exterior diameter substantially equal to or greater than an exterior diameter of said coupler, and wherein said elongated body is provided with a measuring indicia placed on an exterior surface of said elongated body to allow visual observation of a decreasing level of the viscous fluid in said tank caused by dispensing of the viscous fluid from said tank.

* * * * *